Figure 1:
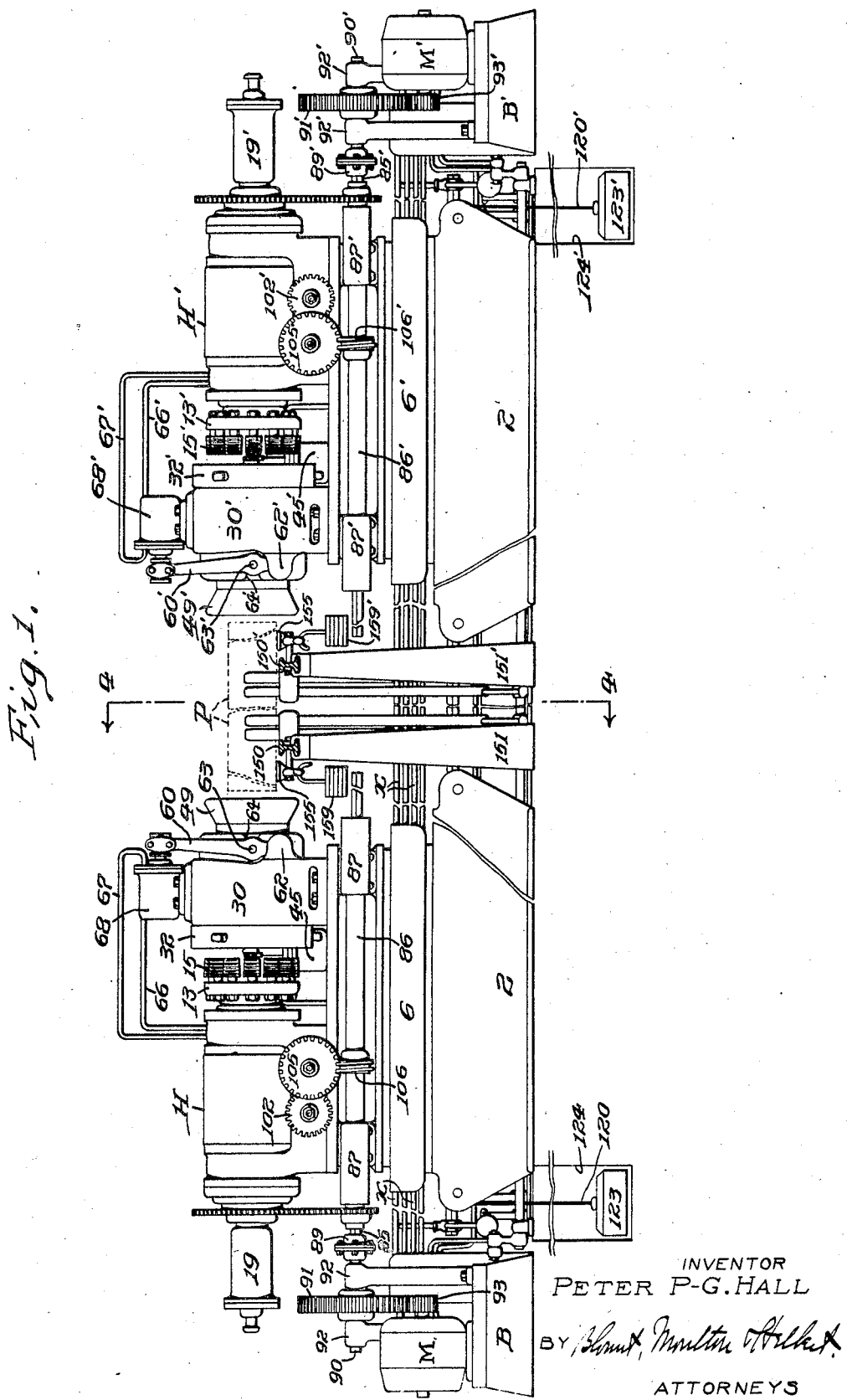

INVENTOR
PETER P-G. HALL
BY
ATTORNEYS

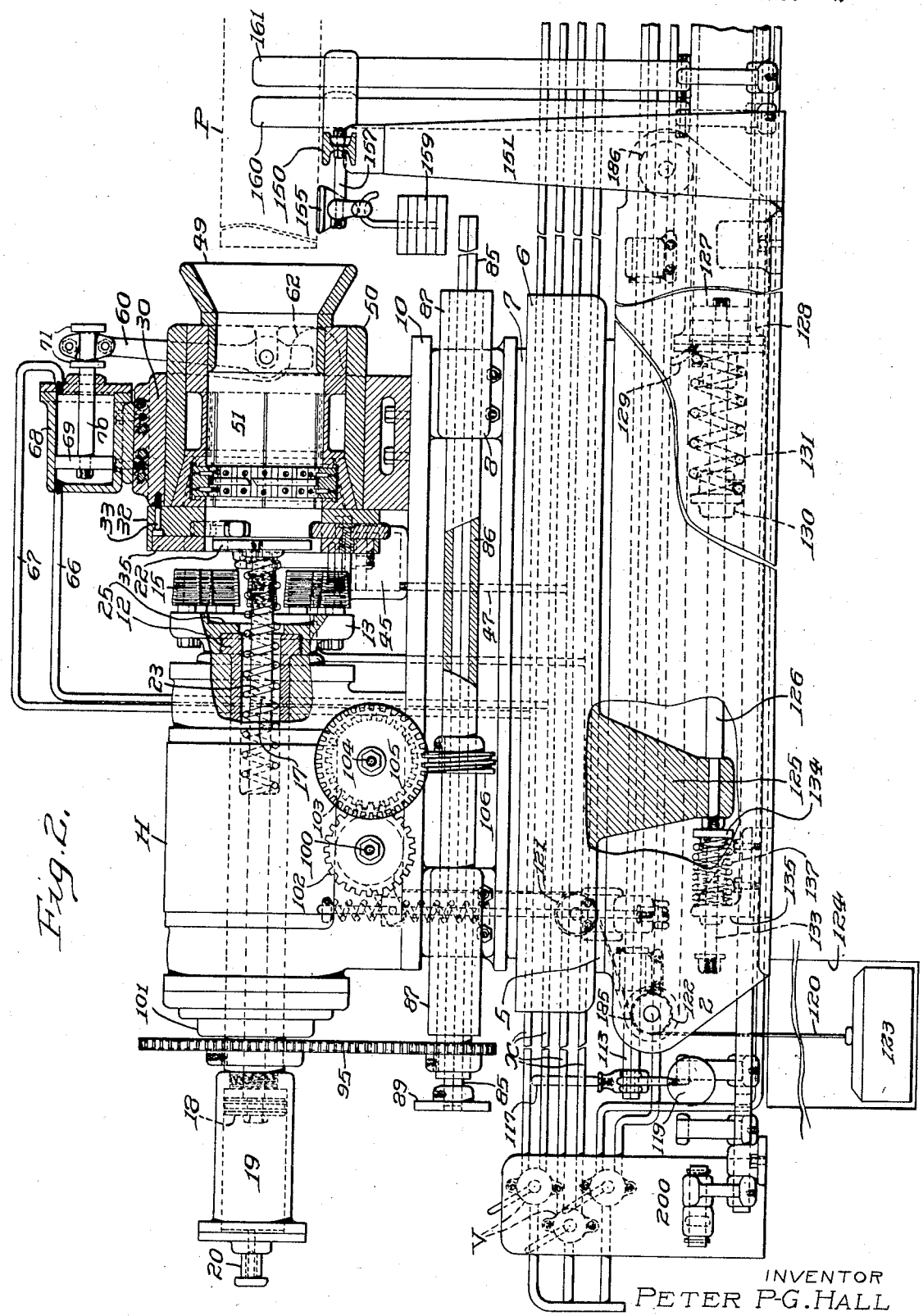

May 12, 1931. P. P. G. HALL 1,804,686
THREAD MILLING MACHINE
Filed Nov. 10, 1922 6 Sheets-Sheet 4
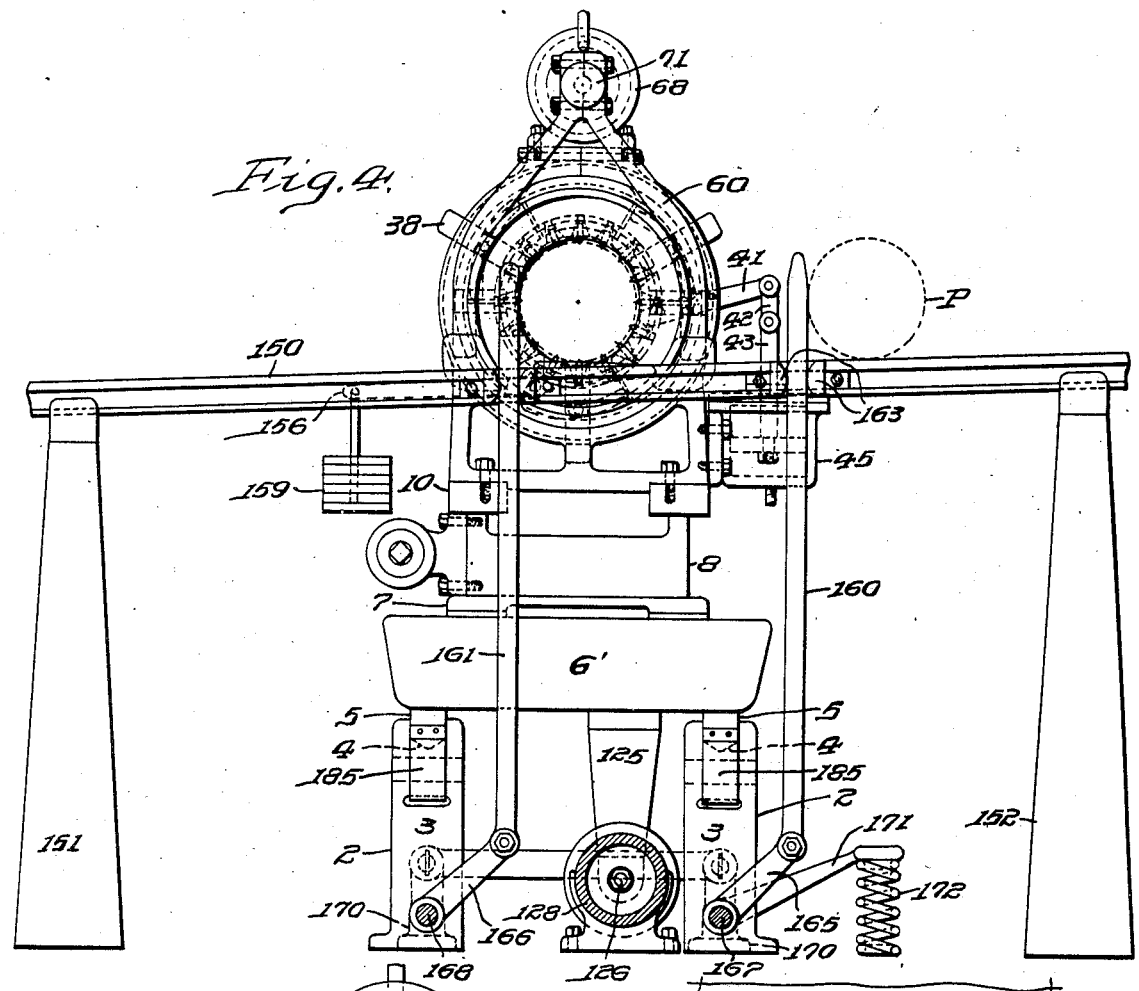
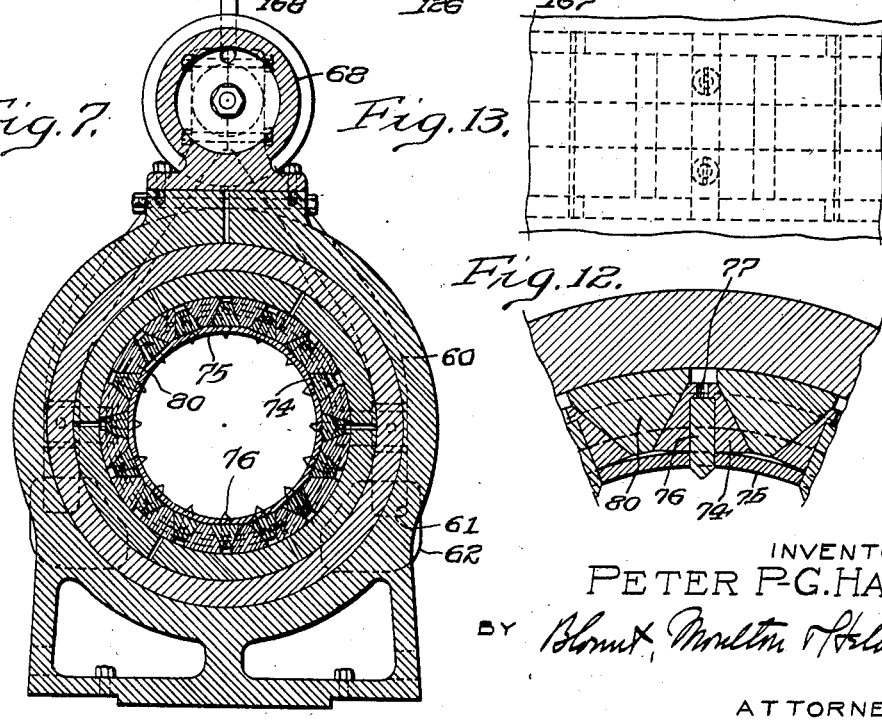
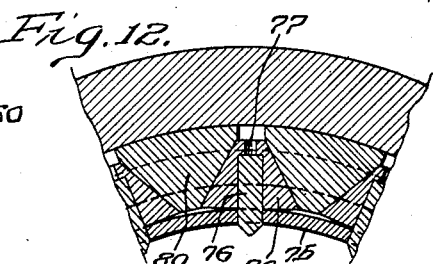
INVENTOR
PETER P.G. HALL
BY
ATTORNEYS

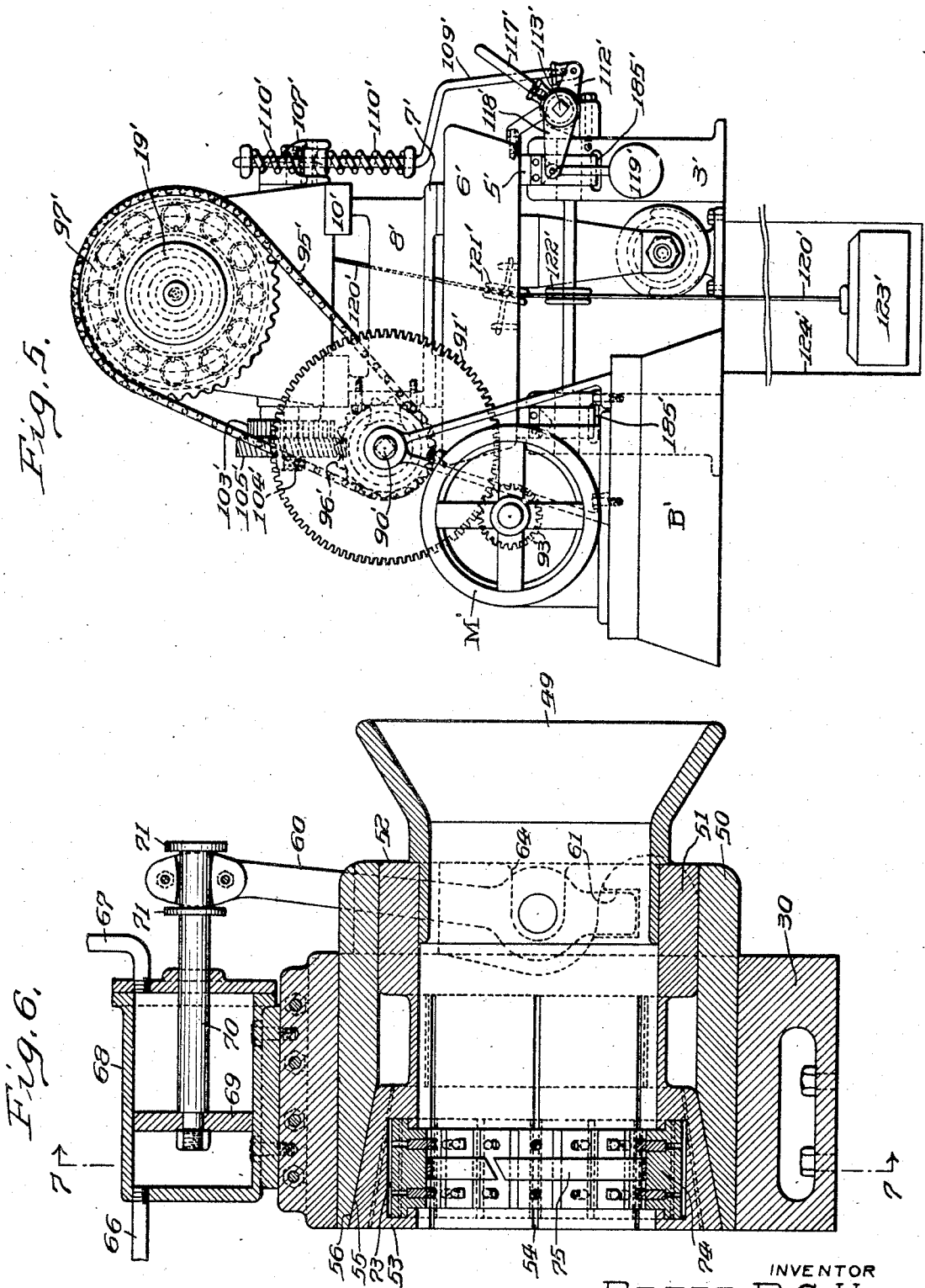

May 12, 1931.   P. P. G. HALL   1,804,686
THREAD MILLING MACHINE
Filed Nov. 10, 1922   6 Sheets-Sheet 6
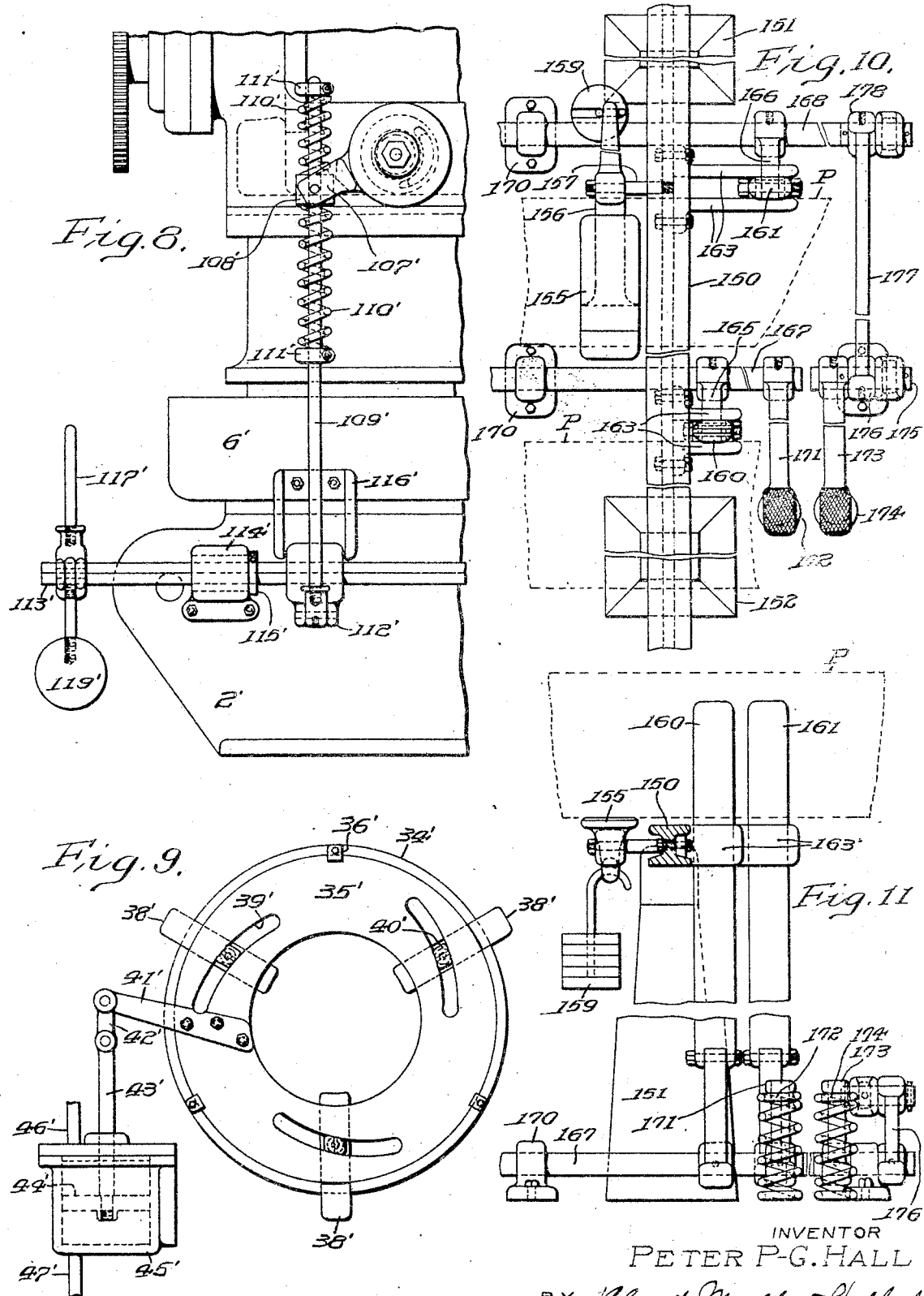
INVENTOR
PETER P-G. HALL
BY Blount, Moulton & Hellat
ATTORNEYS Patented May 12, 1931

1,804,686

UNITED STATES PATENT OFFICE

PETER P. G. HALL, OF PHILADELPHIA, PENNSYLVANIA

THREAD MILLING MACHINE

Application filed November 10, 1922. Serial No. 600,041.

A principal object of my invention is to provide a novel method of and a suitable machine for accurately and rapidly milling threads simultaneously on the ends of sections of pipe, rods or bars, and more particularly upon long sections of pipe such as are employed for oil well casings and the like.

In the production of milled threads on pipe sections of this character, there are certain conditions which are encountered and which must be overcome by a machine to be satisfactorily operative for performing the desired function. Among these may be mentioned those arising from the relatively great length, diameter and weight of the individual sections; the fact that they are frequently more or less out of round or slightly crooked longitudinally or of different lengths, and the fact that the means employed for holding the pipe during the threading operation must be of such character that the pipe is not distorted thereby but, nevertheless, gripped with sufficient firmness to permit the cutters to perform their work, for if the threads are cut while the pipe is distorted it will, after the gripping means are released, spring back to its original form so that the threaded portion will thereafter exhibit an elliptical instead of a truly circular cross section while, of course, if the gripping means permit any slippage of the pipe during the threading operation an irregular and unsatisfactory thread will be produced. Additionally, it is desirable to accomplish the threading operation with the expenditure of a minimum amount of power to thereby enhance economy of production and with a minimum expenditure of labor.

Broadly considered, my invention comprehends the simultaneous formation of, preferably tapered, external or internal threads on both ends of a pipe section of any length by suitably holding the section in rigid position and causing at each end of the section a suitable milling cutter, while revolving on its own axis, to be carried radially into the pipe for a sufficient distance to produce the desired depth of thread and then imparting to the revolving cutters simultaneously a planetary movement around the pipe, a helical movement longitudinally of the pipe and a gradual radial movement with respect to the pipe thereby forming the requisite threads on the pipe. During these operations the cutters at the opposite ends of the pipe are revolved on their own axes in opposite directions and carried about the pipe and moved longitudinally thereof in opposite directions, this feature of opposite rotation and movement of the cutters being of great utility in that the thrust of the cutters on the pipe is thereby substantially equalized. Thus the tendency to twist the pipe about its longitudinal axis which each cutter would exert if operated alone is substantially neutralized one by the other, thereby permitting the pipe to be held in stationary position much more readily than would otherwise be the case and minimizing the likelihood of the holding means causing the undesirable distortion of the pipe to which reference has been made.

While for the purpose of providing a machine suitable for effecting the milling of pipe threads in accordance with my improved method I may utilize any instrumentalities suitable for accomplishing the desired functions, I prefer to employ a pair of the mechanisms for producing threads, in conjunction with suitable cutters, such as disclosed in Letters Patent of the United States No. 1,507,235 granted to me September 2, 1924, with such modifications as are requisite or desirable for adapting the said mechanisms for the purposes of the present invention and in combination and association with means adapted for the performance of certain additional functions, all with a view to producing an organized, unitary machine suitable for the simultaneous, rapid and accurate production by a milling operation of threads on both ends of a section of pipe of the character aforesaid.

As more fully disclosed in Letters Patent No. 1,507,235, the mechanism forming the subject thereof, and which I shall for convenience hereinafter term the "milling head," may be so operated as to effect, among other things, the revolution of a suitable cutter about its own axis and a movement of the cutter radially into the stationarily supported work for the depth required to form the thread; thereafter, for the production of tapered threads, a planetary movement of the rotating cutter about the work and simultaneously therewith a longitudinal movement and a gradual radial movement with respect to the work, these combined movements resulting in the production of the desired tapered helical thread, the mechanism being also effective on the completion of the thread to move the cutter entirely free of the work and to then return it to initial position.

In effecting the objects of the present invention I make use, as hitherto stated, of two of these milling heads each of which is effective, when properly driven, for accomplishing the functions to which reference has just been made, respectively disposing them on suitable carriages at opposite ends of a supporting bed, and arrange for the movement of the respective carriages inwardly toward the center of the bed or outwardly therefrom, so that when the pipe has been brought to a position above the bed between the milling heads, the latter may be moved inwardly to a position in which the cutters may engage the pipe for the purpose of forming the threads thereon, after which operation the carriages may preferably be moved simultaneously outward toward the ends of the bed to permit the removal of the pipe from the machine, suitable mechanism being of course arranged in combination with the heads for effecting the requisite drive of the cutters, preferably in opposite directions.

Additionally since it is desirable for the proper operation of the cutters that the work be maintained in stationary position during the cutting operation and since it is further desirable that the threads on both ends of the pipe be true with respect to a common axis, I provide on each of the carriages suitable means for centering the pipe with respect to the common axis of the milling heads in association with means for firmly gripping and holding the pipe without distortion after it has been properly centered and during the operation of forming the threads. Furthermore, in order to adapt the machine to the rapid and economical production of threaded pipe, I preferably combine and associate therewith suitable means for effecting the conveyance of the pipe by gravity to a position above the bed and for there supporting it until it is centered and gripped by the holding means, as well as for effecting the discharge of the pipe from its position above the bed after it has been threaded and released from the holding means, the said means for effecting the conveyance to and discharge of the pipe from the machine being so arranged that the pipe sections may be consecutively brought into the machine to centering position and discharged therefrom after the threading operation as rapidly as the latter can be accomplished, so that as soon as one section is threaded it may be discharged from the machine and another section immediately introduced therein.

As it is one of the primary objects of the invention to increase the rapidity with which pipe sections may be accurately threaded and to reduce the cost of the threading operation to a minimum the various instrumentalities employed for effecting the required functions are so far as possible designed for automatic operation, and in the preferred embodiment of the invention the means for effecting the control thereof are so disposed and centralized as to permit the entire control of the machine, including the conveyance of the pipe thereto and its discharge therefrom, from a single station and by a single individual.

Moreover, it will of course be understood that for the purpose of providing an organized machine adapted for the performance of the functions and effecting the objects, among others, to which general reference has hitherto been made, the preferred embodiment of the invention comprehends and includes other additional instrumentalities and mechanisms as will hereinafter more fully appear, each of which contributes its respective share to the satisfactory, practcal, rapid, accurate and economical operation of the organized whole.

To enable those skilled in the art to comprehend and practise the invention, I have illustrated in the accompanying drawings and will now proceed to describe one form of machine adapted for the simultaneous production of milled threads on both ends of a pipe in accordance with my improved method, but it will be understood that I do not thereby desire or intend to limit myself to any precise details of construction or arrangement of the various parts of the machine, as the same may be modified as requisite or desirable from the precise embodiments shown for the purpose of better adapting the machine for use under given operative conditions or for other purposes. It will further be understood that as the machine embodies inter alia two of the said milling heads substantially of the form disclosed in my said Letters Patent No. 1,507,235, detailed illustration and description of the said heads and of their method of operation will be omitted herefrom save in such particulars as may be necessary for a proper understanding of the present invention.

In the said drawings Fig. 1 is a general view of the machine in rear elevation, the central portion of the beds being, however, omitted to permit both ends of the machine to be shown. In this view both of the carriages on which milling heads are supported are shown in retracted position, that is, at the limit of their outward movement with respect to the bed. Fig. 2 is an enlarged fragmentary view of the head, gripping chuck and adjacent mechanism at the left end of the machine and in retracted position, the parts being shown partially in rear elevation and partially in central vertical section with the chuck in open position, portions of the pipe feeding mechanism also being shown in proximity thereto, although it will of course be understood that in practise this mechanism is ordnarily disposed more nearly adjacent the center of the machine. Fig. 3 is a view substantially similar to Fig. 2 but showing the head in advanced or cutting position and the chuck closed upon the pipe which is to be threaded. In this view the pipe feeding mechanism shown in Fig. 2 is, however, omitted. Fig. 4 is an enlarged view substantially on line 4—4 in Fig. 1 and looking in the direction of the arrows. Fig. 5 is an end elevation of the right hand end of the machine showing the driving mechanism but with the air control piping and certain other parts omitted. Fig. 6 is an enlarged, central vertical longitudinal section of one of the gripping chucks and adjacent parts in partially open position. Fig. 7 is a transverse section substantially on the line 7—7 in Fig. 6 looking in the direction of the arrows but on a slightly reduced scale. Fig. 8 is a fragmentary detail front elevation of the left hand end of the machine showing the head feed engaging mechanism. Fig. 9 is an end elevation of portions of one of the centering chucks removed from the machine and showing the centering jaws and actuating means. Fig. 10 is a top plan view of one of the pipe feed tracks and portions of the adjacent mechanism including the pipe stops, portions of the pipe feed control mechanism which are normally disposed adjacent the control station at the right hand end of the machine when viewed from the front being shown for convenience of illustration in association therewith. Fig. 11 is a front elevation of the parts shown in Fig. 10; Fig. 12 is an enlarged fragmentary detail view in vertical section of one of the gripping jaws removed from the gripping chuck together with the adjacent actuating blocks and a portion of the contracting ring of the chuck, and Fig. 13 is a top plan view thereof. Like numerals are used to designate the same parts in the several figures.

The machine comprises, generally speaking, a main longitudinally extending bed which may be formed in two sections, as shown, securely mounted on a suitable foundation in aligned relation but separated at the center to permit the passage of certain parts of the pipe feeding and discharge mechanism, or a single unitary bed suitably cut away at the center may be employed if desired. The upper face of the bed is provided with ways, and a carriage cooperative with said ways is disposed at each end of the bed in such manner as to be longitudinally slidable thereon. Each carriage serves to support one of the milling heads as well as centering means and chucking means for the pipe, and means, preferably fluid controlled and conveniently pneumatic in character, are provided for moving each of the carriages along the bed of the machine in either direction. Each of the heads is preferably actuated from suitable driving means, and suitable control means are provided for causing the machine to perform its various functions in proper sequence, said control means being, in the form of machine illustrated, brought to a single station, for example at the right hand end of the machine when viewed from the front, so as to facilitate the control of the machine by a single individual and from a single point. Additionally, means are provided, also preferably controlled from the same point, for conveying the pipes consecutively to a point above the bed in substantial alignment with and between the heads and for holding them there while the carriages are moved inwardly until the ends of the pipe enter the chucks and pass therethrough to contact with suitable movable stops effective to limit the further inward movement of the heads, after which each end of the pipe is properly centered by the adjacent centering means and then gripped in the adjacent gripping chuck which is effective to hold the pipe stationary while the milling of the thread is accomplished simultaneously on both ends of the pipe. On the completion of this operation, the cutters being out of engagement with the pipe, the grip of the chuck is released and the carriages simultaneously retracted to the ends of the bed so as to clear the ends of the pipe and permit it, upon suitable actuation of the discharge mechanism, to roll by gravity from its position above the bed and clear of the machine.

It will be readily understood from the foregoing that substantially similar mechanism is employed on each side of the center line of the machine except insofar as the control elements may be located adjacent one end thereof; in consequence the following description is for convenience in general directed more particularly to the mechanism at the right hand end of the machine when viewed from the front, but is equally applicable to the mechanism adjacent the left hand end of the machine, the corresponding parts at the latter end being designated in the drawings by the same numerals as those at the former but with the addition of a prime (').

As shown, the machine comprises a pair of beds 2, 2' which in practice are secured to a suitable foundation in longitudinal alignment. For convenience of illustration the beds are shown in Fig. 4 as though composed of laterally separated uprights 3 but in practice these uprights are connected together by suitable webs or the like so that they are maintained in rigid alignment with each other, each of the beds 2, 2' thus comprising a single unitary structure. The upper faces of the beds are provided with longitudinal ways 4 for the reception of correspondingly formed rails 5 disposed on the bottom of the carriage 6 which is preferably substantially in the form of a rectangular oil pan open at the top and thus adapted to receive the oil which flows over the cutters and thence downwardly into the oil pan during the cutting operation, from which point it may be conducted through a suitable filter and then returned to the cutters by suitable pumping mechanism (not shown). Integral with each oil pan are supports 7 on which are disposed transversely extending blocks 8 in turn effective to support the auxiliary bed pieces 10, these parts being either formed integrally or suitably secured together. Adjacent the outer end of the auxiliary bed is disposed the milling head generally designated as H which is preferably of substantially the type disclosed in my said Letters Patent No. 1,507,235, and which, among other things, comprises a central spindle 12 which serves to support at its inner end a plate 13 upon which may be mounted a plurality of cutter elements 15 of suitable form for producing the desired thread. A cutter of the general character illustrated forms the subject of my U. S. Letters Patent No. 1,415,339 granted May 9, 1922 and further description thereof herein is therefore unnecessary. If desired, however, as more fully explained in my said Letters Patent No. 1,507,235 a single cutter may be mounted on the spindle 12 instead of a plate carrying a plurality of individual cutter elements, although I prefer to utilize the latter on account of the increased rapidity of production effected thereby.

The spindle 12 is preferably centrally bored for its entire length and a shaft 17 extended therethrough, the outer end of the shaft being provided with a piston 18 movable in an air cylinder 19 provided with an adjustable relief valve 20, the function of this cylinder being to cushion the shaft. The inner end of the shaft 17 carries a buffer or stop plate 22 conveniently of somewhat greater diameter than the pipe P which is to be threaded, while the forward part of the central bore of the spindle is enlarged and a coil spring 23 disposed about the shaft in the chamber thereby formed, the function of this spring being to constantly urge the shaft toward the center of the machine. Preferably the face plate 13 may be recessed as at 25 for the reception of the buffer plate when the latter is moved outwardly to the limit of its travel with respect to the spindle. The function of the buffer plate and associated mechanism will hereinafter appear.

The carriage is also effective to support on the auxiliary beds 10 the centering and chucking mechanism by means of which the pipe is first centered with respect to the axis of the head and then maintained in stationary position during the cutting operation and these parts will next be described.

*Centering mechanism*

This mechanism is supported adjacent the outer faces of hollow cylindrical housings 30, 30' respectively bolted to the auxiliary beds 10, 10' adjacent their inner ends and respectively comprise annular plates 32, 32' secured to the housing by bolts 33, 33'. Referring momentarily for convenience to the mechanism at the left hand end of the machine instead of at the right hand end, the plate 32', as shown in Fig. 9, is provided with an outwardly directed peripheral rim 34' inside of which is mounted a cam ring 35' held in position by clips 36' secured to the rim in such manner as to permit relative rotation between the cam ring and the plate (see Fig. 9). The surface of the plate adjacent the cam ring is provided with three symmetrically disposed radial slots in each of which is slidably positioned a jaw 38', the inner end of which projects into the central aperture of the plate, which similarly to the corresponding aperture of the ring, is of somewhat greater diameter than the exterior diameter of the pipe which is to be threaded. The cam ring adjacent each of the jaws is provided with a curved slot 39' and each of the jaws with a block 40' pivotally supported on the jaw and extending into and cooperative with the adjacent slot in such manner that relative rotation of the ring and plate will cause the jaws to simultaneously move in or out in a radial direction. As hitherto stated, the plate is fixedly secured to the housing 30' and suitable means are provided for effecting movement of the ring with respect thereto, said means conveniently comprising an arm 41' secured to the ring and connected through a link 42' to a piston rod 43' carrying a piston 44' disposed in an air cylinder 45' bolted to the front of the housing 30' or other convenient point so that by admitting air or other fluid under suitable pressure to the upper side of the piston through pipe 46', the jaws may be simultaneously forced inwardly and by admitting air to the under side of the piston through the pipe 47', may be caused to move in a reverse direction.

Projecting inwardly from the opposite end of the housing 30 is a guiding bell 49 having a flaring mouth directed toward the center of the machine which is effective, when the carriage is moved inwardly, to receive the end of the pipe P, irrespective of whether it is properly aligned with the head, and guide it into and through the plate 32, the centering jaws 38 being then, of course, in radially retracted or outward position. During the inward movement of the carriage, the pipe contacts with the buffer plate 22 which is initially at the inner limit of its travel and forces the plate back toward the head until it reaches the outer limit of its travel, thereby bringing the carriage to rest with the cutter in proper position with relation to the end of the pipe, irrespective of the length of the latter. Air is now admitted to the cylinder 45 to move the centering jaws radially inward to bring the outer surface of the pipe to properly centered position in which it is thereafter maintained by the gripping chuck now to be described.

Gripping chuck

Commercial pipe as manufactured, particularly in the larger sizes, is frequently considerably out of round, a condition which makes it extremely difficult if not impossible, without causing a considerable distortion of the pipe wall, to firmly grip the pipe in a chuck of ordinary construction with sufficient firmness to permit a milling operation to be performed on the pipe. As has been previously explained such a distortion of the wall during the thread cutting operation is inimical to the production of properly threaded pipe for the reason that irrespective of the shape of the pipe at the commencement of the cutting operation, the cutter is effective to produce the threads symmetrically with respect to the center of the planetary orbit through which the cutter moves about the work; in consequence, if the threads are thus symmetrically produced on the end of the pipe when the latter is distorted by pressure of the gripping chuck, the moment the latter is removed the pipe will tend to assume its original shape and thereby effect a corresponding distortion of the thread. It is thus requisite for the production of substantially perfect threads that the gripping chuck be effective to firmly hold the pipe irrespective of possible external irregularities and without distortion of its initial shape or form, and I therefore prefer to employ for this purpose a gripping chuck embodying a plurality of relative movable gripping jaws and means for forcing said jaws individually against the pipe in such manner that each individual jaw may independently engage the pipe surface in accordance with its particular shape or disposition adjacent thereto.

More particularly, my preferred form of chuck comprises a sleeve 50 which is housed within the housing 30 and in turn surrounds a split collet generally designated at 51. This collet comprises a ring 52 disposed in one end of the sleeve 50 and from which the jaws 53 of the collet extend toward the other end of the sleeve, these jaws, of which there may be any suitable number, conveniently six as shown, being separated from each other by the cuts or slots 54 which extend back from the inner ends of jaws to the ring and provide for the necessary resiliency in the jaws. The outer surface of the inner extremity of the jaws is beveled or inclined as at 55 and the inner surface of the sleeve correspondingly beveled or inclined as at 56 in such manner that when the collet is pulled into the ring the jaws will be compressed. Means are also provided for effecting longitudinal movement of the collet with respect to the sleeve, said means conveniently comprising a yoke 60 which extends down over the outer end of the sleeve and collet, which latter projects for a suitable distance beyond the outer end of the housing 30, the free lower ends of the yoke being received in pockets 61 formed in lugs 62 disposed on the housing. Extending inwardly through the arms of the yoke and into the ring 52 of the collet are suitable pins 63, the ring being cut away as at 64 to afford a free passage therefor, and the parts being arranged in such manner that when the upper end of the yoke 60 is moved back and forth the lower ends of the yoke will fulcrum in the pockets and the collet be moved longitudinally within the sleeve 50 with a corresponding expansion or constriction of the collet jaws 53. Conveniently, the movement of the yoke is effected pneumatically by the admission of compressed air through air pipes 66 and 67 to an air cylinder 68 mounted on the housing 30 and having a piston 69 and a piston rod 70 which is loosely connected with the upper end of the yoke, as by extending the rod therethrough and providing a stop 71 on either side thereof as best shown in Fig. 6, so that when air is admitted on one side or the other of the piston, the latter will be moved in the cylinder to impart motion in the desired direction to the yoke.

Mounted within the jaws of the collet chuck in a recess 73 formed therein for the purpose are a plurality of gripping jaw blocks 74 supporting the gripping jaws as well as a corresponding number of actuating blocks, the gripping jaws being operative to grip the pipe when forced against it by radial movement of the actuating blocks. The jaw blocks and actuating blocks are preferably retained in operative position within the jaws by an expanding ring or rings 75 split at one point and constantly tending to press the blocks outwardly in a radial direction. More specifically and particularly with reference to Figs. 7, 12 and 13, the gripping jaws are arranged in longitudinally spaced pairs, each jaw, which is desirably made of tool steel suitably hardened, conveniently consisting of a cylindrical body 76 which is pressed into and frictionally or otherwise retained in a bore in the jaw block of suitable depth to allow one end of the jaw to bottom therein and the other end to project beyond the face of the block, the extremity of this projecting end being preferably sharpened to a chisel point. If desired, small holes 77 may be drilled through the jaw blocks from the bottoms of the bores to facilitate removal of the jaws in case of necessity. The jaw blocks are substantially wedge-shaped in transverse section with their sides converging from the face from which the points of the jaws project, these inclined sides being adapted for cooperation with the correspondingly inclined sides of the actuating blocks 80, one of which is disposed between each adjacent pair of jaw blocks with its base resting against the inner face of the collet jaw as best shown in Figs. 7 and 12, both the jaw blocks and actuating blocks being retained in assembled position within the jaws by the expanding ring 75 as already explained, this ring being conveniently disposed between the pairs of gripping jaws. It will be evident that with the various parts constructed and assembled as described, a movement of the collet in the direction to construct the jaws radially inward is effective to force the actuating blocks 80 radially inward and in turn to move the jaw blocks in a similar direction so as to bring the respective pairs of jaws into engagement with the pipe extending into the chuck, but that since each jaw block is capable of a certain amount of independent movement irrespective of the other blocks, each pair of jaws will independently accommodate itself to the adjacent pipe surface so that if the latter be irregular or if the pipe be out of round, a substantially equal pressure will be exerted by all of the jaws against the pipe thereby firmly gripping the same but without distortion, each jaw moving inwardly against the pipe for a sufficient distance to exert the necessary holding power irrespective of the extent of radial movement or amount of pressure exerted by the other jaws.

*Spindle driving and allied mechanism*

In the operation of the machine it is requisite to effect rotation of the spindle 12 as well as the rotation of certain of the other parts contained within the head H to produce the necessary movement of the cutters, and for this purpose suitable means are provided and so arranged that the desired movements may be effected irrespective of the position of the carriage 6 on the bed. To this end I preferably provide a squared shaft 85 which is disposed in a drive tube 86 cylindrical on its exterior and squared for a suitable length on its interior so as to cooperate with the squared shaft 85 in such manner that rotation of the squared shaft will rotate the tube although the latter is longitudinally slidable on former. The tube is rotatably supported in a horizontal position in brackets 87 stationarily mounted on the blocks 8, preferably on the rear side of the machine, and the outer end of the squared shaft is provided with a coupling 89 through which a connection is effected with a short shaft 90 carrying a gear 91 and supported in standards 92 mounted on a base B disposed adjacent the outer end of the bed 2 and upon which is also mounted the driving motor M, the shaft of which carries a pinion 93 in meshing engagement with the gear 91 in such manner that rotation of the squared shaft may be effected from the motor, preferably at a speed considerably less than that of the motor.

For driving the spindle 12 any suitable means may be employed to effect suitable connection between the spindle and the squared shaft, and conveniently for this purpose I employ a chain 95 passing over a sprocket 96 mounted on and near the outer end of the drive tube and over another sprocket 97 disposed on the outer end of the spindle, this latter sprocket being considerably larger in diameter than the sprocket on the squared shaft so as to effect a suitable reduction in speed.

It will thus be apparent that the carriage 6 may be moved in or out on its bed without effecting the driving means for the spindle or interfering with its operation in any position assumed by the carriage, as during movement of the carriage the drive tube 86 slides freely on the shaft while the latter is at all times and in all positions of the carriage capable of effecting the rotation of the drive tube.

The drive tube is also employed to effect the requisite rotation of a transversely extending shaft 100 which passes through and is eccentrically journaled in the base of the head and which is cooperative with certain mechanism in the interior of the head to effect the revolution of the container 101 in which the spindle 12 is supported as more fully explained in my said Letters Patent No. 1,507,235. This shaft 100 carries a gear wheel 102 which is cooperative with another wheel 103 rotatably mounted on a short stud 104 disposed on the base of the head and which also carries a worm wheel 105 which meshes with a worm 106 mounted on the drive tube 87 so as to rotate therewith. In this manner the shaft 100 is caused to rotate whenever the drive tube is rotated and means are provided for throwing the said shaft, which is eccentrically mounted, into and out of engagement with the mechanism within the head which it is designed to operate. Conveniently the said means (as best shown in Fig. 8) comprise a fork 107' extending outwardly from that end of the shaft which projects from the front side of the base of the head and pivotally secured to a collar 108' carried by a generally vertically extending rod 109', the collar being supported on the rod between cushioning springs 110' disposed between suitable collars 111. The lower end of this rod is pivotally connected to one end of a forked crank arm 112' which is slidably mounted at its other end on a squared shaft 113' extending longitudinally along the base of the machine and rotatably supported in suitable brackets 114' secured thereto, collars 115' preventing longitudinal movement of this shaft with respect to the base. In order to effect a movement of the forked crank arm along the shaft in correspondence with the movement of the carriage with respect to the bed, a fork 116' may be mounted on the carriage so as to embrace the crank arm and carry it along the shaft when the carriage is slid along the bed. The crank arm is provided with a squared hole through which the square shaft 113' extends with a sliding fit so that when the latter is oscillated the crank arm is moved correspondingly so as to raise or lower the rod 109'. For turning this shaft in its supports so as to raise or lower the rod 109', one or more levers 117' are mounted on the shaft conveniently near the ends thereof which may be projected beyond the bases of the machine, one of the handles thus lying in proximity to the control panel hereinafter referred to. Preferably, moreover, the shaft is provided with one or more counterpoise arms 118' at the ends of which are mounted counterpoise weights 119' to balance the weight of the rod 109' and adjacent parts. Thus, by raising or lowering any of the levers 117', the shaft 100' may be moved in its eccentric mounting so as to throw it into or out of engagement with the mechanism which it actuates in the head, and as the crank arm 112' is capable of longitudinal slidable movement along the shaft 113', the mechanism is operative irrespective of the position of the carriage upon the bed.

Means are also provided for imparting to the container 101 a movement of rotation in a direction the reverse of that imparted thereto by the shaft 100, this reverse rotation being for the purpose of returning the cutter elements to initial position after the completion of the operation of cutting the thread, said means conveniently comprising a cord 120 which is coiled about the container 101 within the milling head H and extends downwardly through the base of the latter and over suitably mounted sheaves 121 and 122 respectively carried by the carriage and the bed, and is connected to a weight 123 disposed in a pit 124 arranged beneath the machine in such manner that when the container is revolved in one direction from the shaft 100 the cord will be wound up upon the container and the weight lifted in the pit, disconnection of the shaft 100 from the mechanism which it actuates within the head permitting the container to rotate in reverse direction as the cord is unwound therefrom as the weight descends in the pit.

Carriage actuating means

Suitable means are provided for effecting the requisite movement of the carriages longitudinally of their respective beds whereby the carriages may be retracted toward the outer ends of their beds so as to permit the pipe P to be moved into position in the machine between the bells 49, 49' and the carriages thereafter moved inwardly so as to enter the ends of the pipe in the bells and finally bring the carriages to proper position for threading, and for this purpose I may conveniently employ pneumatic or other fluid controlled means or other suitable mechanism. More particularly, in the form of machine illustrated, I may provide each carriage with a downwardly depending lug 125 which is disposed between the uprights 3 and in the lower end of which is secured a longitudinally extending piston rod 126 connected at its inner end with a piston 127 disposed in an air cylinder 128 into the ends of which air pipes 129 are connected in a manner to permit the admission of air to either side of the piston as may be desired, the air cylinder being preferably disposed toward the inner end of the bed.

In order to cushion parts when the carriage is moved inwardly for substantially the maximum movement of which it is capable in that direction, I may secure a collar 130 at a suitable position on the piston rod and dispose between it and the head of the cylinder a buffer spring 131, while for cushioning the parts when the carriage is retracted outwardly and approaches the limit of possible movement in that direction, I provide a cushion stop comprising a plunger 133 having a flange 134 at its inner end and mounted in a support 135 in alignment with the piston rod 126 and surround the plunger with a suitable spring 137 in such manner that when the end of the piston rod 126 is brought into contact with the flange, the plunger will move back in the support and compress the spring, as shown in Fig. 2, thus gradually bringing the carriage to rest.

Loading mechanism

In order to facilitate the introduction of the pipe into the machine and its discharge therefrom after the threading operation is completed as well as for facilitating the entrance of the pipe into the bells and for affording support adjacent the center of the pipe during the threading operation, I preferably combine and associate with the machine suitable mechanism by means of which the pipe may be conveyed to the machine by gravity, arrested in substantial alignment with the mouths of the bells 49, 49' yieldingly supported in such position in such manner as to permit it to readily enter the bells as they are moved over its ends and during the threading operation, and finally, after the threading operation and retraction of the carriages, discharged from the machine by gravity.

To attain these results, I preferably provide a plurality of tracks 150, conveniently two in number, longitudinally spaced apart for a suitable distance to support the pipe and mounted on suitable pedestals 151, 152 in such manner as to incline slightly downwardly from the front to the back of the machine as best shown in Fig. 4. These tracks may be of any desired length and are preferably arranged to extend across the bed of the machine from a point at which the pipes may be conveniently placed thereon by suitable conveying mechanism to a point at which they may be removed therefrom by other suitable conveying mechanism. These conveying mechanisms for placing the pipes on and removing them from the tracks form no part of my invention, and will obviously be of different character in different plants and will be arranged, and the tracks will obviously be positioned and made of a length, to suit the particular conditions of operation encountered.

The tracks are preferably arranged at such height that when the pipe, as it rolls down the tracks, reaches a point in which it is in substantial longitudinal alignment with the bells 49, 49', its axis would be slightly below the axis of the bells in the absence of the mechanism now to be described, and which is effective to yieldingly or floatingly support the pipe as it approaches a position of alignment with the bells and to slightly lift the pipe above the rails at that point so as to bring its axis into substantial alignment with the axis of the bells. More specifically, said mechanism preferably comprises two or more floating platforms 155 each disposed at one end of a lever 156 which is supported on a horizontal pivot 157 in turn conveniently supported from the web of each track 150 in such manner that the lever is adjacent and at a suitable distance from the track. At the opposite end of the lever is disposed a suitable counterpoise 159 of such size that it will overbalance the platform and lift the latter slightly above the surface of the adjacent track in such manner that the platform normally assumes a substantially horizontal position as best shown in Fig. 4 with its end toward the front of the machine substantially level with the track at that point, and its opposite end slightly elevated above the track. It will further be understood that the lengths of the lever arms are so proportioned and the weight of the counterpoise so arranged that as the pipe rolls down the tracks by gravity and passes from the tracks onto the platforms and against the stops, hereinafter described, by which it is brought to rest, it will be slightly elevated above the tracks and substantially balanced by the counterpoises so that thereafter but a relatively slight force is required to raise or lower the platforms, and in turn the pipe, about the pivots 157. Thus by reason of the yielding support afforded to the pipe, the bells 49, 49' can easily pick up the ends of the pipe when the carriages are moved inwardly and the mechanism is thereby relieved from shocks or excessive duty which might otherwise be imposed thereon if the pipe were slightly out of alignment and supported on a non-yielding support. Additionally, the platforms are effective to support the pipe at spaced points between its ends and more or less adjacent its center so that sagging or bending of the pipe between the points where it is clamped by the gripping chucks is prevented.

For controlling the position of the pipe on the tracks and platforms, I provide suitable means so arranged that one section of pipe may be held at a suitable distance in front of the machine while the preceding section is being operated upon in the machine. Conveniently one form of such means may comprise vertical stops 160, 161 adjacent each track and which extend freely between clips 163 carried thereby so that the upper ends of the stops are suitably supported laterally. The lower ends of the stops 160 are connected to short arms 165 and the lower ends of the stops 161 to corresponding arms 166, the former being mounted on a longitudinally extending shaft 167 and the latter on a corresponding shaft 168 arranged in suitable supports 170 near the base of the machine and preferably extending for substantially the full length of the machine. For actuating the shaft 167 suitable means, for example a foot lever 171, are provided and positioned adjacent the control panel of the machine and a spring 172 arranged beneath the lever so that at all times the stops 160 will be kept in raised position save when the lever is depressed sufficiently to remove the stops from the path of the pipe and permit the pipe to pass from the dotted line position at the right hand side of Fig. 4 to a position against the stops 161 and on the platforms 155. The shaft 168 is also conveniently arranged for actuation in a substantially similar manner by a foot lever 173 which is continually upwardly pressed by the spring 174, this lever being mounted on a short shaft 175 disposed in suitable supports and having an arm 176 connected by a link 177 with a corresponding arm 178 on the shaft 168 in such manner that depression of the pedal 174 will be effective to lower the stops 161 and permit the pipe to roll off of the platforms, onto the rails and thence out of the machine.

It will thus be apparent that as the pipe sections are consecutively placed on the elevated ends of the rails they will roll down until arrested by the stops 160; that thereafter by depressing these stops the foremost section may be permitted to pass onto the platforms 155 and against the stops 161, in which position it is ready to be picked up by the inwardly moving bells. After the threading operation is completed and the bells moved outwardly off the pipe, the latter is supported by the platforms and stops 161 until the latter are lowered by the operator and the pipe permitted to roll out of the machine, after which the following section is admitted by again lowering the stops 160. In this manner the pipe sections may be very rapidly fed to and discharged from the machine with a minimum expenditure of labor.

*Way protecting mechanism*

I preferably provide the machine with means for protecting the ways 4 from accumulation of the chips of metal which are thrown off by the cutters during operation and which, in the absence of such protective means, might fall on the ways with resultant damage thereto when the carriages are moved thereon, and for this purpose I preferably employ strips or belts 185 of canvas or other suitable material. One of these belts is attached at its ends to the ends of each of the rails 5 from which points the belt is led in opposite directions over freely rotatable sheaves 186 and 187 horizontally pivoted adjacent the ends of the bed 2. Each belt is of sufficient width to substantially cover the adjacent machined portions of the ways, and as the carriage is moved to and fro the belts are moved therewith, thereby protecting the ways from the accumulation of chips or other foreign matter.

*Operating mechanism*

To facilitate the operation of the various elements, the mechanism through which their control is effected may conveniently be disposed adjacent the right hand end of the machine, the valves V for controlling the various air pipes X being mounted on a suitable control panel 200 arranged adjacent the foot pedals 171 and 174, the feed reset lever 117 and the rheostat or other means (not shown) for controlling the drive motors M, M' being also conveniently located adjacent thereto so that the operator, standing in front of the control panel, is enabled to handle from a single point all of the mechanism requisite for effecting the several functions of the machine during the operation of handling and threading the pipe.

*Operation*

In the operation of the machine the pipe sections are deposited consecutively on the elevated end of the tracks and roll by gravity downwardly thereon until arrested by the stops 160, 160'. The carriages being in retracted or extreme outward position, the yokes controlling the chuck collets in a position in which the gripping chucks are open and the centering chucks being also adjusted with their jaws in retracted position, the stops 160 are lowered and the leading section of pipe permitted to roll down against the stops 161, 161' in which position it is floatingly or yieldingly supported on the platforms 155, 155'. Air is now admitted to the air cylinders 128, 128' in a direction to move the carriages inwardly and preferably simultaneously which operation carries the bells 49, 49' over the ends of the pipe. Thereafter, further inward movement of the carriages brings the latter to a point at which the ends of the pipe contact with the buffer plates 22, 22' and as the movement of the carriages continues the buffer plates are gradually pushed back toward their respectively adjacent spindles until they are received in the recesses 25, 25', thereby automatically arresting further inward movement of the carriages, the pipe itself thus acting as the stop for determining the extent of the movement of the carriages. At this point or, under certain circumstances, prior thereto, the centering chucks are actuated by the admission of air to the cylinders 45, 45' thereby centering each end of the pipe with respect to its adjacent cutter, after which the gripping jaws in each gripping chuck are closed upon the pipe by the admission of air to the cylinders 68, 68' to thereby cause the independently acting gripping jaws to securely grip and maintain the pipe in its previously properly centered position.

It will be noted that the inward movement of the carriages is sufficient, in the preferred form of the invention, to bring the inner ends of the cutter elements 15, 15' up on the pipe for a distance equal to the length of the thread to be formed thereon, from which position the cutter elements, during the formation of the thread, are moved outwardly toward the extremities of the pipe for a sufficient distance to entirely clear the same.

The spindles 12, 12' are now set in motion in opposite directions so as to effect the rotation of each cutting head on its own axis and the spindle containers 101, 101' rotated through the feed mechanisms within the heads H, H' which are actuated from the transverse shafts 100, 100', so as to move the cutter elements into the pipe for the requisite distance to produce the desired depth of thread at the point at which the elements are then cutting. Through the operation of the feed mechanisms, which form no part of the present invention but are fully disclosed and claimed in my said Letters Patent No. 1,507,235, the cutter elements adjacent the head H, assuming a tapered thread is to be cut, are then moved in a planetary orbit about the pipe in one direction and the elements adjacent the head H' are similarly moved about the pipe in the opposite direction, and simultaneously therewith each set of elements is moved outwardly toward the adjacent end of the pipe and also fed radially inward with respect to the pipe, these several combined movements of the elements simultaneously producing on both ends of the pipe a similar tapered thread. If the cutting elements are carried about the pipe and rotated in opposite directions as in the preferred form of the invention, both of the threads will be either right hand or left hand, depending on whether the master screws within the heads by which the longitudinal movement of the cutter elements is effected are right hand or left hand, but of course should it be so desired, the machine may be arranged so that threads of opposite direction will be produced on the ends of the pipe, and by suitable adjustment and operation of the heads and cutters, straight threads, as distinguished from tapered, may be milled with equal facility.

It will be observed that in the preferred embodiment of the machine, the torque of the cutters on the pipe is substantially equalized one by the other so that there is but little or no tendency to twist the pipe within the gripping chucks. This feaure is of distinct advantage in that it permits the pipe to be held in the chucks with a minimum of pressure and, additionally, relieves to a very great extent the strains and stresses which would otherwise be present in the several parts of the machine. It will be further observed that during the cutting operation each head and its adjacent mechanism is clamped in properly centered relation directly to the end of the pipe which serves in large measure as a support therefor, so that irrespective of any slight bends or irregularities which may be present between the ends of the pipe, each thread will be formed correctly at each end of the pipe; a result which would be impossible of accomplishment with a crooked pipe in a machine designed to support the pipe in the middle and to cut the threads on the ends by mechanism maintained in theoretically proper relation with the supporting means so as to properly form threads at the ends of an absolutely straight pipe.

The cutters having been moved by the feed mechanism outwardly with respect to the heads for a sufficient distance to complete the threads on the ends of the pipe and thus incidentally to clear the latter, the gripping and centering chucks are released and the carriages moved outwardly for a sufficient distance to move the bells clear of the ends of the pipe, the cutters through the operation of the return feed mechanism actuated by the weights 123, 123' meanwhile having been returned to their initial position. The stops 161, 161' are now depressed and the pipe permitted to roll out of and away from the machine on the tracks which completes the operation on that particular pipe section and places the machine in condition to receive the following section which has meanwhile rolled down against the stops 160, 160'.

While in the particular embodiment of machine herein illustrated and described, the various mechanisms requisite or desirable for controlling the machine and its parts in the performance of their several co-related functions are adapted and arranged for manual operation, preferably from a single station as hereinbefore described, it will be understood that it is fully within the purview and scope of the present invention to so arrange the controlling mechanisms as to make the machine entirely automatic in operation, thereby avoiding the necessity for any manual control thereof whatsoever. This end may be readily effected where desired by the employment of means or mechanisms of any suitable form as will be readily understood by those familiar with the art pertaining to the operation of completely automatic machines.

Moreover, while I have herein described and illustrated with considerable particularity a preferred embodiment of a machine adapted for manual control and suitable for the performance of my improved method of milling threads in pipe, bars, rods or the like, I do not thereby desire or intend to limit myself in any manner to any precise arrangement of parts or specific form of means for accomplishing the objects and functions of my invention, as any means other than those to which I have referred and which are suitable therefor may be utilized by me or the machine employed for the threading of articles other than pipe if so desired, without departing from the spirit and scope of my invention as defined by the appended claims.

Having thus described my invention, I claim and desire to protect by Letters Patent of the United States:

1. A machine of the class described comprising a supporting bed, a pair of milling heads supported in opposed relation on the bed and each adapted to cause a rotating milling cutter to move in a planetary orbit about a stationarily supported piece of work disposed between the heads, means for actuating the heads, means for simultaneously moving the heads longitudinally of the supporting bed in opposite directions, and means adjacent and longitudinally movable with each head for chucking the work in a stationary position between the heads.

2. A machine of the class described comprising a supporting bed, a pair of milling heads supported on the bed each adapted to cause a rotating milling cutter to move in a planetary orbit about a piece of work stationarily supported between the heads, means adjacent and movable with each milling head for centering the work with respect to the adjacent head, and means movable with each head for chucking the work after it has been centered by said centering means.

3. In a machine of the class described, the combination of a supporting bed, a pair of carriages slidable on the bed, a milling head supported on each carriage and adapted to actuate a milling cutter to perform a milling operation on a piece of work supported between the heads, a chuck carried by each carriage and adapted to grip the work and hold it in position to be operated on by the cutter actuated by the adjacent head, and means for actuating the heads to drive the cutters irrespective of the position of the carriages on the bed.

4. In a machine of the class described, the combination of a supporting bed, a pair of oppositely disposed milling heads each adapted to cause a milling cutter to simultaneously rotate on its own axis, move in a planetary orbit about a stationarily supported piece of work and move longitudinally and also radially with respect to the work, a carriage slidably supporting each head on its bed, means for simultaneously actuating the heads to cause the aforesaid movements of the cutters and operative in any position of the carriages with respect to the bed, and means for moving the carriages toward or away from the center of the bed.

5. In a machine of the class described, the combination of a supporting bed, a pair of oppositely disposed milling heads supported on the bed and each adapted to cause a rotating milling cutter to move in a planetary orbit about a stationarily supported piece of work, means for actuating the heads so as to cause the cutters to revolve in opposite directions, means for moving the heads longitudinally of the bed toward or away from the center thereof, and means movable with the respective heads for stationarily supporting the work between the heads in a position to be acted on by the cutters.

6. In a machine of the class described, the combination of a supporting bed, a pair of oppositely disposed milling heads supported on the bed and each adapted to cause a rotating milling cutter to move in a planetary orbit about a stationarily supported piece of work, means for actuating the heads so as to cause the cutters to revolve in opposite directions, means for moving the heads longitudinally of the bed toward or away from the center thereof, and means cooperative with the work for limiting inward movement of each head along the bed as it is moved to working position whereby on each inward movement each head is brought to rest in the same relative position with respect to the adjacent end of the work irrespective of the overall length of the work.

7. In a machine of the class described, the combination of a supporting bed, a pair of oppositely disposed milling heads each adapted to actuate a milling cutter to rotate on its own axis and also to move in a planetary orbit about a stationarily supported piece of work, a carriage slidably supporting each head on the bed, means for simultaneously actuating the heads so as to cause the milling cutters to revolve and to move in opposite directions and operative in any position of the carriages with respect to the bed, means for moving the carriages toward or away from the center of the bed, means carried by each head cooperative with the work to limit the inward movement of the carriages along the bed as they are moved to working position whereby each carriage and its head are brought to rest at the end of each inward movement in the same definite relation with respect to the adjacent end of the work irrespective of variations in the overall length of different pieces of work.

8. In a machine of the class described, the combination of a supporting bed, a pair of carriages slidable on the bed, a milling head supported on each carriage and adapted to actuate a milling cutter to perform a milling operation on a piece of work supported between the heads, a chuck carried by each carriage and adapted to grip the work and hold it in position to be operated on by the cutter actuated by the adjacent head, means for actuating the heads to drive the cutters irrespective of the position of the carriages of the bed, and a centering device movable with each carriage and comprising simultaneously radially movable jaws operative to center the adjacent end of the work with respect to the adjacent head prior to the gripping of the work in the adjacent chuck.

9. In a machine of the class described, the combination of a supporting bed, a pair of oppositely disposed milling heads each adapted to cause a milling cutter to simultaneously rotate on its own axis, move in a planetary orbit about a stationarily supported piece of work and move longitudinally with respect to said work, a carriage slidably supporting the head on its bed, means for simultaneously actuating the heads to cause the aforesaid movements of the cutters and operative in any position of the carriages with respect to the bed, and means for moving the carriages toward or away from the center of the bed.

10. In a machine of the class described having a bed provided with ways and a carriage slidable on said ways, means for protecting said ways from an accumulation of chips and the like and comprising a sheave disposed adjacent each end of the ways and aligned therewith and a flexible element secured at its ends to the opposite ends of the carriage and extending over both of said sheaves and over the exposed portions of the ways.

11. In a machine of the class described having a bed provided with ways and a carriage slidable on said ways, means for protecting said ways from an accumulation of chips and the like and comprising a flexible element having its ends secured to opposite ends of the carriage in alignment with said ways and extending both over and under said ways and movable with the carriage.

12. In a machine of the class described having a bed provided with ways and a carriage slidable on said ways, means for protecting said ways from an accumulation of chips and the like and comprising sheaves disposed adjacent the ends of and aligned with the ways and a flexible belt of sufficient width to substantially cover the ways having its ends secured to the carriage and its main portion extending over and under the ways and about said sheaves.

In witness whereof, I have hereunto set my hand this 26th day of October, A. D. 1922.

PETER P. G. HALL.